US012589497B2

(12) United States Patent
Walter et al.

(10) Patent No.: US 12,589,497 B2
(45) Date of Patent: Mar. 31, 2026

(54) MONITORING SYSTEM AND METHOD FOR OPERATING THE SYSTEM

(71) Applicant: Siemens Aktiengesellschaft, Munich (DE)

(72) Inventors: Maximilian Walter, Nuremberg (DE); Thomas Kahabka, Pommelsbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 150 days.

(21) Appl. No.: 18/638,309

(22) Filed: Apr. 17, 2024

(65) Prior Publication Data

US 2024/0351210 A1    Oct. 24, 2024

(30) Foreign Application Priority Data

Apr. 20, 2023    (EP) .................................... 23169001

(51) Int. Cl.
B25J 9/16 (2006.01)
G01C 3/08 (2006.01)

(52) U.S. Cl.
CPC .......... B25J 9/1676 (2013.01); B25J 9/1697 (2013.01); G01C 3/08 (2013.01)

(58) Field of Classification Search
None
See application file for complete search history.

(56) References Cited

U.S. PATENT DOCUMENTS

| | | | |
|---|---|---|---|
| 9,196,150 B2 * | 11/2015 | Cs .......................... | G08B 21/22 |
| 12,112,224 B2 * | 10/2024 | Hollar ................ | G06K 7/10415 |
| 2011/0029278 A1 | 2/2011 | Tanigawa | |
| 2020/0290205 A1 | 9/2020 | Hammes et al. | |
| 2023/0096023 A1 * | 3/2023 | Zucker ................... | A61B 34/30 |
| | | | 606/1 |

FOREIGN PATENT DOCUMENTS

| | | | |
|---|---|---|---|
| EP | 3709106 | 9/2020 | |
| EP | 4198550 A2 * | 6/2023 | ............ B25J 13/089 |

* cited by examiner

*Primary Examiner* — Arslan Azhar
(74) *Attorney, Agent, or Firm* — Cozen O'Connor

(57) ABSTRACT

A method and monitoring system includes a first person detector that is configured to output a first position indicator relating to a person identified in a monitoring region via a first channel, a second person detector which is configured to output a second position indicator relating to the person identified in the monitoring region via a second channel, and a diagnostic unit having first input for receiving the first position indicator, a second input for receiving the second position indicator, and a first output for a checked position indicator relating to the identified person and a second output for an error signal.

10 Claims, 4 Drawing Sheets

MONITORING SYSTEM AND METHOD FOR OPERATING THE SYSTEM

BACKGROUND OF THE INVENTION

1. Field of the Invention

The invention relates to a monitoring system, comprising a first person detector which is configured to output a first position indicator relating to a person identified in a monitoring region via a first channel, a second person detector which is configured to output a second position indicator relating to the person identified in the monitoring region via a second channel, and a diagnostic unit having a first input for receiving the first position indicator, a second input for receiving the second position indicator, and having a first output for a checked position indicator relating to the identified person and a second output for an error signal, where the diagnostic unit is configured to check the first position indicator and the second position indicator with in to plausibility and to output these as the checked position indicator in the event that the first position indicator and the second position indicator are reciprocally plausible, and is further configured to identify an error and to output the error signal at the second output in the event that the plausibility check fails.

In the context of the invention, a fail-safe automation system is understood to be an industrial controller which is certified according to the International Electrotechnical Commission (IEC) standard 62061 and is therefore formed as a controller that is configured to provide functional safety.

2. Description of the Related Art

Fail-safe automation systems control processes that can immediately adopt a safe state as a result of unexpected operating characteristics or a failure. Such systems include fail-safe control processes in which an immediate shutdown into a safe state does not represent a hazard to persons or the environment. Fail-safe systems go beyond conventional safety engineering and activate extensive intelligent systems extending to the electric drives and measuring systems. Users will install fail-safe systems in applications with increased safety requirements. By virtue of the improved error identification and localization in fail-safe systems owing to more detailed diagnostic information, production can be resumed quickly following a safety-related interruption.

Conventional person detectors already achieve very high quality and are evaluated using fail-safe automation devices. However, requirements arising from the context of "functional safety" are not satisfied. These requirements include a safe diagnosis that reveals all conceivable errors in a monitoring system and subsystems thereof, such as cameras, laser scanners, artificial neural networks, and/or communication lines. The person detectors are therefore structured to have two channels, and the position indicator of the first channel is checked for plausibility with the position indicator of the second channel.

In the event that an error is diagnosed in at least one of the two channels, this is signaled by the error signal "failure detected". The subsequent decision making is thereby caused to adopt a safe state (e.g., immediate shutdown of the machine). In addition to actual errors (e.g., failure of a camera), this diagnosis can also be triggered by a mistake of the user, e.g., if a user disappears behind an object or adopts a position in which they are no longer identifiable as a person by at least one person detector. In such cases, the safety function is triggered unnecessarily, thereby adversely affecting the equipment availability.

SUMMARY OF THE INVENTION

In view of the foregoing, it is accordingly and object of the invention to provide a system for visually monitoring a workspace that overcomes the above-described disadvantages.

In view of the foregoing, it is therefore an object of the invention is to provide a method and system that increase equipment availability.

This and other objects and advantages are achieved in accordance with the invention by a monitoring system in which a diagnostic unit of the monitoring system comprises a memory for a position tolerance that can be output via a third output, and that is configured to, in the event of a failed plausibility check, consider the most recently checked position indicator as a center of a circle or a ball and the position tolerance as a radius of said circle or ball, and to calculate a resulting circular area or sphere therefrom, where the points of the circular area or sphere are output at the first output as a possible substitute position indicator. The monitoring system further comprises a decision unit that is connected to the first output, the second output and the third output and that has a machine list in which a machine location and a protection radius around the machine location are specified at least for a first machine.

Additionally, the decision unit is further configured to, in the case of the circular area, rate the resulting points of the circular curve as least favorable whereabouts of the identified person and to, in the case of the ball, rate the resulting points of the ball surface as least favorable whereabouts of the identified person, and is further configured to, using the least favorable whereabouts and the data relating to the machine location with its protection radius, determine a distance from the least favorable whereabouts to a boundary line or boundary area that is formed by the protection radius of the first machine, and to trigger a safety function for the machine if a minimum distance is not satisfied.

In accordance with the invention, the known diagnostic unit is supplemented with an output for an indicator relating to the position tolerance "error bound" or error limit. This specifies the maximum error, e.g., in meters, in the checked position that has been output as "checked positions". If the "checked positions" output is, e.g., a set of 3D vectors (x, y, z for each person), and "error bound" is a scalar per person, then the persons are safe in each case when situated in the balls around the centers defined by "checked positions" whose radius corresponds to the respective "error bound". The "checked positions" outputs can also be 2D coordinates, specifically the position of persons on the ground, the balls becoming circles in this case. It is equally possible to specify a vector relating to "checked position" for "error bound", either in two dimensions or in three dimensions, where the ball becoming a cuboid (3D) or the circle become a rectangle (2D) in this case.

In the following, reference is made generally to a "safety bubble", which can be a ball, circle, cuboid or rectangle, depending on the configuration. In the error-free case, the value of "error bound" corresponds to the absolute accuracy of the person detector, where the accuracy is dependent on the structural format thereof. For example, this could be fixed at 0.5 m. It is also possible for the accuracy of the person detector to depend on the distance of the person from the camera or more generally on the position of the person.

The diagnostic unit knows this position. As a result, the diagnostic unit can determine and specify the accuracy at runtime accordingly.

If an error occurs which results in at least one channel no longer being able to determine the position of a person (e.g. because the person has disappeared behind an object), then the output "failure detected" is set. The downstream decision unit "decision making", which is realized using conventional safe technical methodologies, can now decide based on the circumstances whether the shutdown of machines is necessary or not. For example, if the distance from all hazardous machines is great enough, taking the "error bound" into consideration, the unit can decide to continue with operation, even if the exact position of a person is not known. The availability of the equipment is significantly improved thereby. Serious errors (e.g., failure of both channels, or a hardware problem ascertained in one of the two channels) can still be indicated by the diagnostic unit, e.g., by setting the "error bound" to a very high value. Alternatively, in addition to the output "error detected", a further Boolean output "fatal error detected" is conceivable.

In a further improved embodiment of the monitoring system, the diagnostic unit is configured to increase the position tolerance as a function of the time, where a time counter is provided in the diagnostic unit for this purpose and is started when the error signal is set, and where the diagnostic unit is further configured to poll the time counter and to increase the position tolerance by a predeterminable amount in each case after a predeterminable time step is reached.

In the context of safety engineering, it is normally assumed that persons in factories move at a maximum speed of 2 m/s. Therefore the diagnostic unit can continue to output a meaningful "checked position" by providing the last known "checked position" with an adapted position tolerance. The position tolerance is increased as a function of the time for which the person is not visible. For example, the position tolerance is increased by the value 0.2 m if the person is not visible for 100 ms.

Even if the system is realized in an objectively safe manner, the user may experience a subjective feeling of insecurity because the way in which the system functions is not immediately clear. As a result of working in the vicinity of a hazardous machine without a physical separation (e.g., a protective fence), continuous exposure to stress may occur in some cases and have corresponding negative consequences for health.

For this purpose, the monitoring system also has at least one projector that is configured to project the circular area or the sphere onto a ground of the monitoring region or into the monitoring region (FOV) respectively, where the decision unit is configured to provide the projection data to the projector.

Persons are thereby continuously informed that the safety function is active and they can continuously reassure themselves that their position is being captured correctly.

In a further improvement, the projector is configured along with the decision unit to project, in an error-free case, a first circular area around the checked position indicator relating to the identified person, in order to give the identified person feedback about the safe identification of their position and furthermore, in case of error, to project a second circular area around the most recently checked position indicator using the substitute position indicator relating to the identified person, in order to give the identified person feedback about those positions that the person is still allowed to enter within a foreseeable time without triggering the safety function.

This means that the "safety bubble" specified by the decision making, or the circle that is produced when the "safety bubble" is projected onto the ground, can be visually communicated to the person concerned on a continuous basis. This is done using the projectors, which can be attached, e.g., to ceiling with the cameras. A fail-safe automation system sends the corresponding image information or projection data to the relevant projector or projectors for this purpose.

This image information therefore comprises an inner safety bubble, which contains the position at which the person is to be found at present. This information is used, e.g., to stop machines if a predetermined distance is not satisfied. In addition, the image information comprises a larger outer safety bubble, which contains the positions which the person could enter within a foreseeable time. This information is used, e.g., to run machines at lower speed, i.e., ready to brake, if a predetermined distance to this safety bubble is not satisfied.

The display of these safety bubbles offers the following advantages over simple calculation and evaluation in the safety function:

Persons are continuously informed that the safety function is active, and they can continuously reassure themselves that their position is correctly captured. The subjective feeling of safety is significantly improved thereby, and the exposure to stress is reduced.

Persons can see at a glance how close they can come to specific machines without provoking a reduction in speed or a stoppage of the machine. Unintentional triggering of the safety function is thereby prevented and the equipment availability is increased.

In the event that a person can no longer be localized, this is immediately visible due to a swelling of the safety bubble (at a speed of 2 m per second). The person can then adopt measures to prevent a stoppage of machines. If the inability to localize is caused by e.g. an obstruction, it would be possible for the person to, e.g., step out from behind the obstruction. Here, the person could be localized exactly again, the safety bubble would shrink back to its normal size, and an equipment halt would be avoided.

A further improvement consists in activating acoustic warning signals when the safety bubble exceeds a specified size, in order to alert persons to a potentially imminent equipment halt.

In the event of an actual failure of the person detector (e.g., loss of a camera), even stepping out from behind an obstruction would not stop the swelling of the safety bubble. In this case, it is proposed to provide "safe spaces" at regular intervals in the factory building and at a safe distance from all hazardous machines. Acknowledge switches can be installed in these spaces. If a person proceeds to such a space after the warning signal has sounded, and activates the acknowledge button, the system thereby indirectly receives the exact position of the person and an equipment halt is avoided. It is particularly beneficial to provide the "safe spaces" at the exits of the building, so that persons can leave the building after activating the acknowledge button without triggering a new alarm.

These acknowledge buttons can also be portable in certain cases. For example, a mobile touch panel may be provided in a manufacturing cell and have a safe permission button. Assuming that the cable of the touch panel has a fixed length, the pressing of the permission button verifies that a person is situated within the cell. At the same time, the user confirms by pressing the button that the machines located in the cell are allowed to move slowly. This scenario is particularly beneficial if it is anticipated that a person will be difficult to localize in specific areas, e.g., due to poor visibility for cameras in these areas.

The objects and advantages in accordance with the invention are likewise achieved by a method for operating a monitoring system for identifying a position of a person, where a first position indicator relating to the person identified in a monitoring region is output via a first channel via a first person detector, and a second position indicator relating to the person identified in the monitoring region is output via a second channel via a second person detector, the first position indicator and the second position indicator are checked for plausibility and in the event that the first position indicator and the second position indicator are reciprocally plausible these are provided as a checked position indicator, and furthermore in the event that the plausibility check fails an error is identified and the error signal is output at the second output.

In accordance with the method, via a predeterminable position tolerance, in the event that the plausibility check fails, the most recently checked position indicator is defined as a center of a circle or a ball and the position tolerance is defined as a radius of the circle or the ball, and a resulting circular area or sphere is calculated therefrom, where the points of the circular area or the sphere are provided as a possible substitute position indicator.

Furthermore, via a machine list in which a machine location and a protection radius around the machine location are specified at least for a first machine, in the case of the circular area, the resulting points of the circular curve are rated as least favorable whereabouts of the identified person, and in the case of the ball the resulting points of the ball surface are rated as least favorable whereabouts of the identified person, where the least favorable whereabouts and the data relating to the machine location with its protection radius are used to determine a distance from the least favorable whereabouts to a boundary line or boundary area that is formed by the protection radius, and a safety function for the machine is triggered if a minimum distance is not satisfied.

In order to increase the equipment availability further, the position tolerance is increased as a function of the time, for which purpose a time counter is started when the error signal is set, where the time counter is then polled cyclically and the position tolerance is increased by a predeterminable amount in each case after a predeterminable time step is reached.

In order to provide greater safety for persons, a projector is operated such that the circular area or the sphere is projected respectively onto the ground of the monitoring region or into the monitoring region.

The projector can also be supplied with projection data such that, in an error-free case, a first circular area is projected around the checked position indicator relating to the identified person, thereby providing the identified person with feedback about the safe identification of their position and furthermore, in case of error, a second circular area is projected around the most recently checked position indicator using the substitute position indicator relating to the identified person, in order to provide the identified person with feedback about those positions which the person is still allowed to enter within a foreseeable time without triggering the safety function.

The enormous advantage over conventional methods is that the person to be identified is provided with continuous visual feedback with respect to whether or where they have been identified by the system at that time. This results in an increased subjective feeling of safety and therefore a reduction in stress. Furthermore, in the case of a great many errors or if the system is used incorrectly, persons are given the possibility to adopt countermeasures to avoid an equipment halt. The equipment availability is thereby significantly increased.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing shows an exemplary embodiment and developments of the invention, in which.

DETAILED DESCRIPTION OF THE EXEMPLARY EMBODIMENTS

Figure 1:
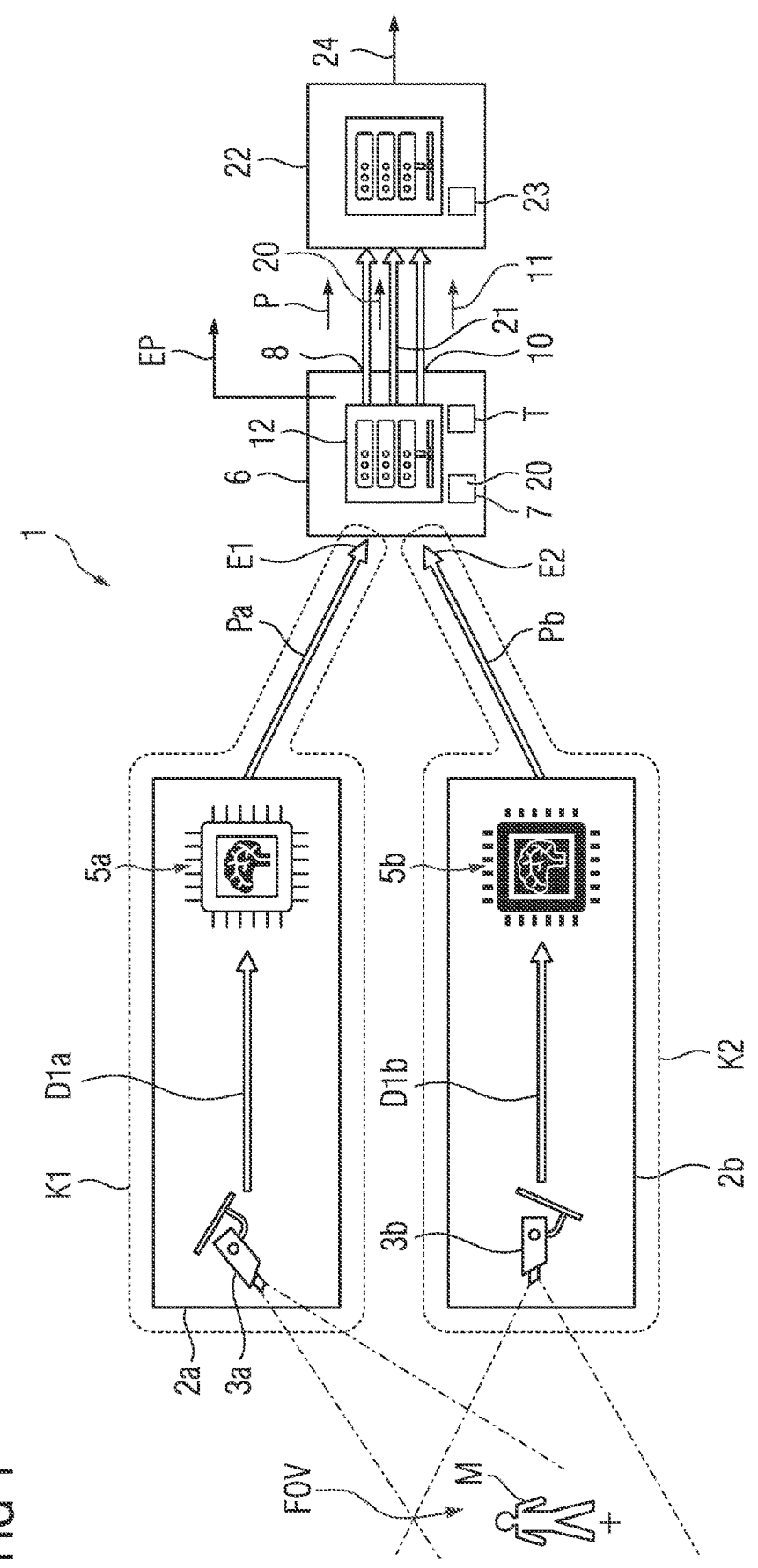
FIG. 1 shows a monitoring system in a two-channel configuration in accordance with the invention.

Illustrated in FIG. 1 is a monitoring system 1 comprising a first person detector 2a and a second person detector 2b. The person detectors 2a, 2b are configured to output a first position indicator Pa and a second position indicator Pb relating to a person M identified in a monitoring region FOV via a first channel K1 and a second channel K2, respectively. A diagnostic unit 6 has a first input E1 for receiving the first position indicator Pa and a second input E2 for receiving the second position indicator Pb, and further to this a first output 8 for a checked position indicator P relating to the identified person M and a second output 10 for an error signal 11.

The diagnostic unit 6 is configured to check the first position indicator Pa and the second position indicator Pb for plausibility, and in the event that the first position indicator Pa and the second position indicator Pb are reciprocally plausible to output these as the checked position indicator P. In the event that the plausibility check fails, the diagnostic unit 6 is configured to identify an error and to output the error signal 11 at the second output 10. The diagnostic unit 6 is also configured to check the output of the position indicator P relating to the identified person M for plausibility via a checking unit 12, preferably using a plurality of plausibility criteria. The diagnostic unit 6 is also configured to identify an error and to output the error signal 11 at the second output 10 in the event that the plausibility check fails.

The diagnostic unit 6 has a memory 7 for a position tolerance 20 that can be output via a third output 21, and is configured to, in the event of a failed plausibility check, consider the most recently checked position indicator P as a center MP of a circle or a ball and the position tolerance 20 as a radius of said circle or ball, and to calculate a resulting circular area KF or sphere SP therefrom (see also FIG. 2), where the points of the circular area or the sphere SP are output at the first output 8 as a possible substitute position indicator EP.

A decision unit 22 is connected to the first output 8, the second output 10 and the third output 21 and has a machine list 23 in which a machine location PA1 and a protection radius R around the machine location PA1 are specified at least for a first machine A1.

The decision unit 22 is further configured to, in the case of the circular area KF, rate the resulting points of the circular curve KR as least favorable whereabouts of the identified person M and, in the case of the ball, to rate the resulting points of the ball surface as least favorable whereabouts of the identified person M.

Using the least favorable whereabouts and the data relating to the machine location PA1 with its protection radius R, it is now possible to determine a distance a from the least favorable whereabouts to a boundary line BGL or boundary area BGF that is formed by the protection radius R of the first machine A1, and to trigger a safety function 24 for the machine A1 if a minimum distance is not satisfied.

The diagnostic unit 6 is configured to increase the position tolerance 20 as a function of the time t (see also FIG. 3), for which purpose a time counter T in a memory 10 is provided in the diagnostic unit 6 and is started when the error signal 11 is set. The diagnostic unit 6 is configured to poll the time counter T and to increase the position tolerance 20 by a predeterminable amount M in each case after a predeterminable time step ZS is reached.

The first channel K1 has essentially two components. A first component takes the form of a first camera 3a and a second component takes the form of a first evaluation unit 5a.

For the purpose of safety, the second channel K2 also has essentially two components. A first component takes the form of a second camera 3b and a second component takes the form of a second evaluation unit 5b.

The first person detector 2a has the first camera 3a for recording digital image files D1a. The person detector 2a can optionally also have a laser sensor system for recording point clouds. The first evaluation unit 5a is configured to evaluate the image files D1a or the point clouds, and to output a position indicator Pa relating to a person M identified in a monitoring region FOV.

The second evaluation unit 5b is configured to evaluate the image files D1b or the point clouds, and to output a position indicator Pb relating to a person M identified in the monitoring region FOV.

The individual channels are advantageously characterized by maximum diversity. For example:

a) The cameras of the individual channels observe the scene from different viewing angles, e.g., from the side (wall mounting) and from above (ceiling mounting).

b) Use is made of cameras and artificial neural network hardware from different manufacturers.

c) The models running on the artificial neural networks have been trained and tested using different training data.

d) The models running on the artificial neural networks for the purpose of object identification are different (e.g., YOLO versus FairMOT).

e) Different measuring principles are applied, e.g., RGB camera versus infrared camera, event camera versus frame camera, and/or camera versus radar.

By virtue of this diversity, it is possible to identify not only random hardware errors but also systematic errors.

Figure 2:
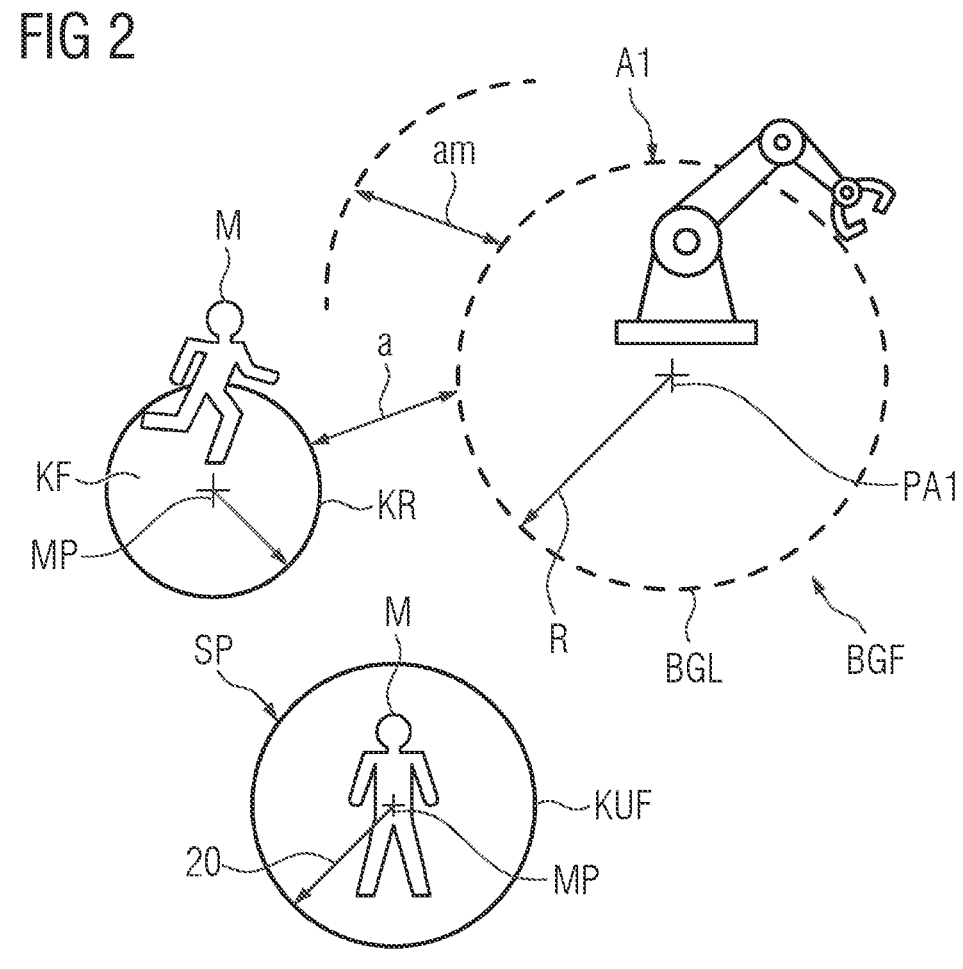
FIG. 2 shows a schematic illustration of persons coming close to a machine in accordance with the invention.

With reference to FIG. 2, a machine A1 is set up at a machine location PA1. Starting from the machine location PA1 that represents the center of a circular area or a ball and applying the protection radius R, a circular area having a boundary line BGL or a ball having a boundary area BGF is formed around the machine location PA1. A person M is situated in a circular area KF and is standing at the center MP of the circular area KF. In the event of an error, the points of the circular curve KR resulting from the circular area KF are rated as least favorable whereabouts of the identified person.

Using the least favorable whereabouts and the data relating to the machine location PA1 with its protection radius R, a distance a from the least favorable whereabouts to the boundary line BGL or the boundary area BGF that is formed by the protection radius R is determined and a safety function 24 for the machine A1 is triggered if a minimum distance am is not satisfied. It is also possible to form a safety bubble around a person M using a further center MP, such that with a sphere SP and starting from the center MP of the person M, the safety bubble has the radius of the position tolerance 20 and the surface of the ball is the ball surface KUF.

Figure 3:
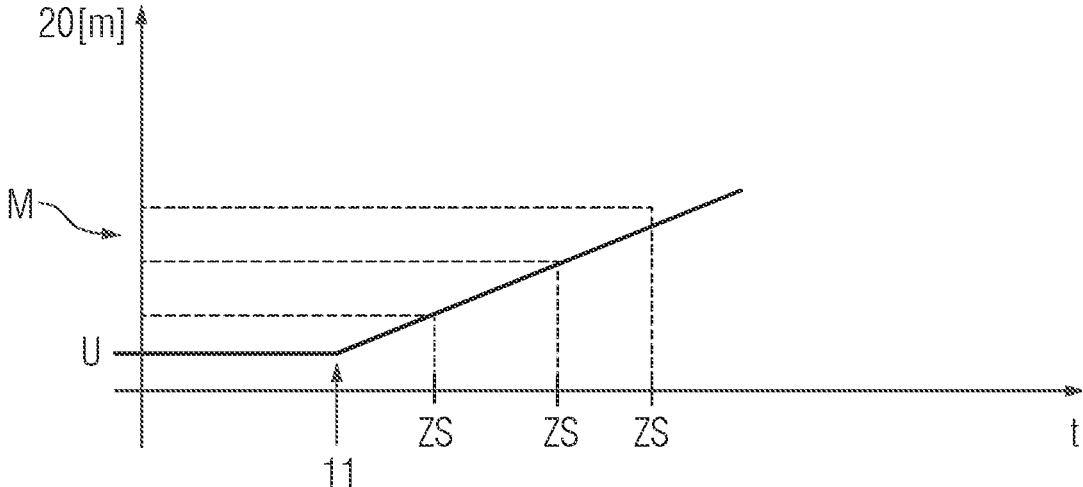
FIG. 3 shows a temporally dependent increase of the position tolerance in accordance with the invention.

FIG. 3 shows that the position tolerance 20 is increased as a function of the time t, for which purpose a time counter T is started when the error signal 11 is set, where the time counter T is then polled cyclically and the position tolerance 20 is increased by a predeterminable amount Ma in each case after a predeterminable time step ZS is reached. The position tolerance 20 starts with a measuring accuracy U that is specified by the system.

Figure 4:
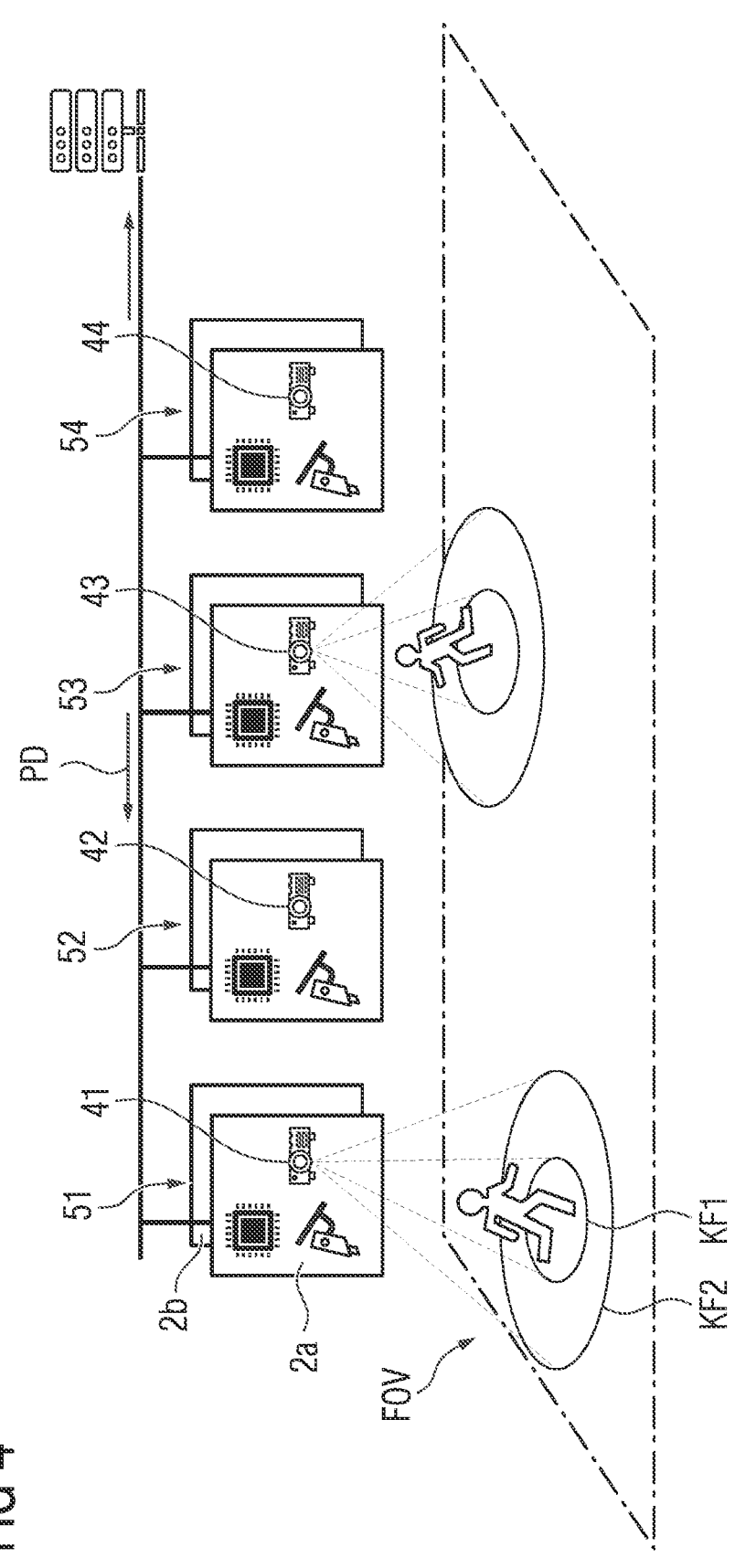
FIG. 4 shows a monitoring system comprising a plurality of detectors and projectors in accordance with the invention.

Illustrated in FIG. 4 is a work area in which persons can move around. There is a first apparatus 51 with the first and second person detectors 2a, 2b, a second apparatus 52 also with two person detectors, a third apparatus 53 likewise with two person detectors, and a fourth apparatus 54 again in a two-channel configuration with two person detectors. The apparatuses 51, 52, 53, 54 each have a respective projector 41, 42, 43, 44.

A person M situated in the monitoring region FOV is safely captured by the first person detector 2a and the second person detector 2b. In order to provide the person M with feedback relating to their safe capture, the first projector 51 projects an inner circular area KF1 onto the ground of the monitoring region FOV. If the two results of the positions from the person detectors 2a, 2b are no longer plausible, then a second somewhat larger circular area KF2 is projected around the person by the first projector 41.

Figure 5:
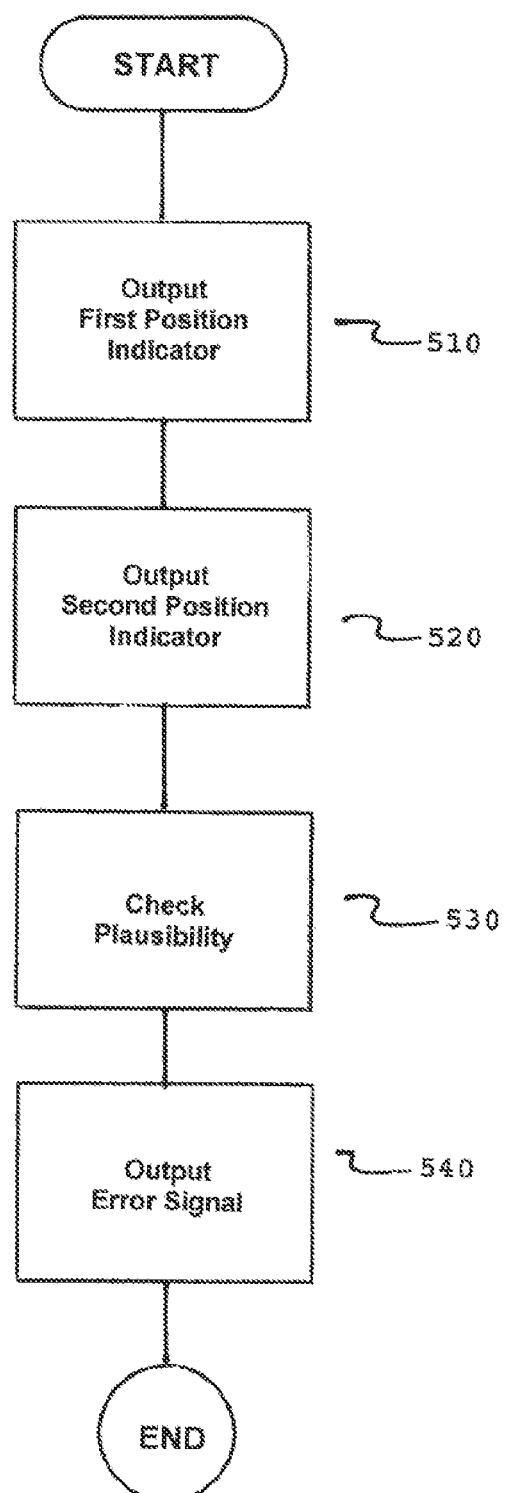
FIG. 5 is a flowchart of the method in accordance with the invention.

FIG. 5 is a flowchart of the method for operating a monitoring system 1 for identifying a position of a person M. The method comprises outputting, by a first person detector 2a, a first position indicator Pa relating to a person M identified in a monitoring region FOV via a first channel K1, as indicated in step 510.

Next, a second position indicator Pb relating to the person M identified in the monitoring region FOV is output via a second channel K2 by a second person detector 2b, as indicated in step 520.

Next, the first and second position indicators Pa, Pb are checked for plausibility and, in an event that the first and second position indicators Pa, Pb are reciprocally plausible, the first and second position indicators Pa, Pb are provided as a checked position indicator P, as indicated in step 530.

Next, in an event that the plausibility check fails an error is identified, and the error signal 11 is output at the second output 10, as indicated in step 540.

In accordance with the method, a via predeterminable position tolerance 2, in the event that the plausibility check fails, the most recently checked position indicator P is defined as a center MP of a circle or a ball and the position tolerance 20 is defined as a radius of the circle or the ball, and a resulting circular area KF or sphere SP is calculated therefrom, the points of the circular area KF or the sphere SP being provided as a possible substitute position indicator EP.

In accordance with the method, via a machine list 23 in which a machine location PA1 and a protection radius R around the machine location PA1 are specified at least for a first machine A1, in a case of the circular area KF resulting points of the circular curve KR are rated as least favorable whereabouts of the identified person M, and in a case of the ball the resulting points of a ball surface are rated as least favorable whereabouts of the identified person M.

In accordance with the method, the least favorable whereabouts and data relating to the machine location PA1 with a protection radius R of the first machine are used to determine a distance a from the least favorable whereabouts to a boundary line BGL or boundary area BGF which is formed by the protection radius R, and a safety function 24 for the machine A1 is triggered if a minimum distance am is not satisfied.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A monitoring system, comprising:
a first person detector which is configured to output a first position indicator relating to a person identified in a monitoring region via a first channel;
a second person detector which is configured to output a second position indicator relating to the person identified in the monitoring region via a second channel;
a diagnostic unit having:
   a first input for receiving the first position indicator;
   a second input for receiving the second position indicator;
   a first output for a checked position indicator relating to the identified person; and
   a second output for an error signal; and a decision unit which is connected to the first output, the second output and a third output and includes a machine list in which a machine location and a protection radius around the machine location are specified at least for a first machine;
wherein the diagnostic unit is configured to check the first and second position indicators with respect to plausibility and to output these as the checked position indicator in an event that the first and second position indicators are reciprocally plausible, and is further configured to identify an error and to output the error signal at the second output in an event that the plausibility check fails;
wherein the diagnostic unit includes a memory for a position tolerance which is output via the third output, the diagnostic unit being configured to, in the event of the failed plausibility check, consider a most recently checked position indicator as a center of a circle or a ball and the position tolerance as a radius of said circle or ball, and being configured to calculate a resulting circular area or sphere therefrom;
wherein points of the circular area or sphere are output at the first output as a possible substitute position indicator;
wherein the decision unit is further configured to, in cases of the circular area, rate resulting points of the circular curve as least favorable whereabouts of the identified person and to, in cases of the ball, rate resulting points of a ball surface as least favorable whereabouts of the identified person; and
wherein the decision unit is further configured to, utilizing the least favorable whereabouts and data relating to the machine location with a protection radius of the first machine, determine a distance from the least favorable whereabouts to a boundary line or boundary area which is formed by the protection radius of the first machine, and further configured to trigger a safety function for the machine if a minimum distance is not satisfied.

2. The monitoring system as claimed in claim 1, wherein the diagnostic unit is further configured to increase the position tolerance as a function of time, a time counter being provided in the diagnostic unit and being started when the error signal is set, and is further configured to poll the time counter and to increase the position tolerance by a predeterminable amount in each case after a predeterminable time step is reached.

3. The monitoring system as claimed in claim 2, further comprising:
at least one projector which is configured to project the circular area onto a ground of the monitoring region or the sphere into the monitoring region;
wherein the decision unit is further configured to provide the projection data to the projector.

4. The monitoring system as claimed in claim 1, further comprising:
at least one projector which is configured to project the circular area onto a ground of the monitoring region or the sphere into the monitoring region;
wherein the decision unit is further configured to provide the projection data to the projector.

5. The monitoring system as claimed in claim 4, wherein the projector is configured along with the decision unit to project, in an error-free case, a first circular area around the checked position indicator relating to the identified person such that the identified person is provided with feedback about a safe identification of their position and furthermore, in the case of error, to project a second circular area around the most recently checked position indicator utilizing the substitute position indicator relating to the identified person such that the identified person is provided with feedback about those positions which the person is still allowed to enter within a foreseeable time without triggering the safety function.

6. A method for operating a monitoring system for identifying a position of a person, the method comprising:

outputting, by a first person detector, a first position indicator relating to a person identified in a monitoring region via a first channel;

outputting, by a second person detector, a second position indicator relating to the person identified in the monitoring region via a second channel;

checking the first and second position indicators for plausibility and, in an event that the first and second position indicators are reciprocally plausible, providing the first and second position indicators as a checked position indicator; and identifying an error, in an event that the plausibility check fails, and outputting the error signal at the second output;

wherein a via predeterminable position tolerance, in the event that the plausibility check fails, the most recently checked position indicator is defined as a center of a circle or a ball and the position tolerance is defined as a radius of the circle or the ball, and a resulting circular area or sphere is calculated therefrom, the points of the circular area or the sphere being provided as a possible substitute position indicator;

wherein via a machine list in which a machine location and a protection radius around the machine location are specified at least for a first machine, in a case of the circular area resulting points of the circular curve are rated as least favorable whereabouts of the identified person, and in a case of the ball the resulting points of a ball surface are rated as least favorable whereabouts of the identified person;

wherein the least favorable whereabouts and data relating to the machine location with a protection radius of the first machine are used to determine a distance from the least favorable whereabouts to a boundary line or boundary area which is formed by the protection radius, and a safety function for the machine is triggered if a minimum distance is not satisfied.

7. The method as claimed in claim 6, wherein the position tolerance is increased as a function of the time, for which purpose a time counter is started when the error signal is set, the time counter is then cyclically polled and the position tolerance is increased by a predeterminable amount in each case after a predeterminable time step.

8. The method as claimed in claim 7, wherein a projector is operated such that the circular area or the sphere is projected respectively onto a ground of the monitoring region or into the monitoring region.

9. The method as claimed in claim 6, wherein a projector is operated such that the circular area or the sphere is projected respectively onto a ground of the monitoring region or into the monitoring region.

10. The method as claimed in claim 9, wherein the projector is supplied with projection data such that, in an error-free case, a first circular area is projected around the checked position indicator relating to the identified person, such that the identified person with feedback about a safe identification of their position and furthermore, in case of error, a second circular area is projected around the most recently checked position indicator utilizing the substitute position indicator relating to the identified person, such that the identified person is provided with feedback about those positions which the person is still allowed to enter within a foreseeable time without triggering the safety function.

* * * * *